(12) United States Patent
Harriman et al.

(10) Patent No.: US 9,262,347 B2
(45) Date of Patent: Feb. 16, 2016

(54) METHOD, APPARATUS AND SYSTEM FOR MEASURING LATENCY IN A PHYSICAL UNIT OF A CIRCUIT

(71) Applicant: Intel Corporation, Santa Clara, CA (US)

(72) Inventors: David J. Harriman, Portland, OR (US); Mahesh Wagh, Portland, OR (US); Abdul R. Ismail, Beaverton, OR (US); Daniel S. Froelich, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 14/126,926

(22) PCT Filed: Oct. 30, 2013

(86) PCT No.: PCT/US2013/067396
§ 371 (c)(1),
(2) Date: Dec. 17, 2013

(87) PCT Pub. No.: WO2015/065349
PCT Pub. Date: May 7, 2015

(65) Prior Publication Data
US 2015/0117504 A1   Apr. 30, 2015

(51) Int. Cl.
*H04B 17/00* (2015.01)
*G06F 13/00* (2006.01)

(52) U.S. Cl.
CPC ..................... *G06F 13/00* (2013.01)

(58) Field of Classification Search
CPC ....... G06F 13/00; G06F 13/4291; G06F 1/32; H04L 12/12
USPC ................................... 375/224–228
See application file for complete search history.

(56) References Cited

U.S. PATENT DOCUMENTS

| 8,023,530 | B1 | 9/2011 | Giallorenzi et al. |
| 2009/0006688 | A1 | 1/2009 | Hu et al. |
| 2010/0260062 | A1 * | 10/2010 | Senga et al. .................. 370/252 |
| 2012/0014377 | A1 | 1/2012 | Joergensen et al. |
| 2013/0177015 | A1 * | 7/2013 | House et al. .................. 370/389 |
| 2014/0006677 | A1 * | 1/2014 | Iyer et al. ...................... 710/316 |

FOREIGN PATENT DOCUMENTS

EP   2477364 A1   7/2012

OTHER PUBLICATIONS

Patent Cooperation Treaty, Notification of Transmittal of the International Search Report and the Written Opinion of the International Searching Authority mailed Jul. 23, 2014, for international application No. PCT/US2013/067396.

* cited by examiner

*Primary Examiner* — Qutbuddin Ghulamali
(74) *Attorney, Agent, or Firm* — Trop, Pruner & Hu, P.C.

(57) ABSTRACT

In an embodiment, an apparatus includes a counter to count between a start value and an end value according to a local clock signal, a first register to store an output of the counter, a mirror elastic buffer to store samples of the counter output received from the first register, where the mirror elastic buffer is to mirror an elastic buffer of a receiver circuit, and a resolution logic to receive a counter output sample from the mirror elastic buffer and a current counter value output from the counter, and to determine a transit latency for a data element to traverse the receiver circuit based at least in part on the counter output sample and the current counter value. Other embodiments are described and claimed.

16 Claims, 10 Drawing Sheets

METHOD, APPARATUS AND SYSTEM FOR MEASURING LATENCY IN A PHYSICAL UNIT OF A CIRCUIT

TECHNICAL FIELD

This disclosure pertains to computing systems, and in particular (but not exclusively) to providing information regarding transit latency for communications.

DETAILED DESCRIPTION

Figure 1:
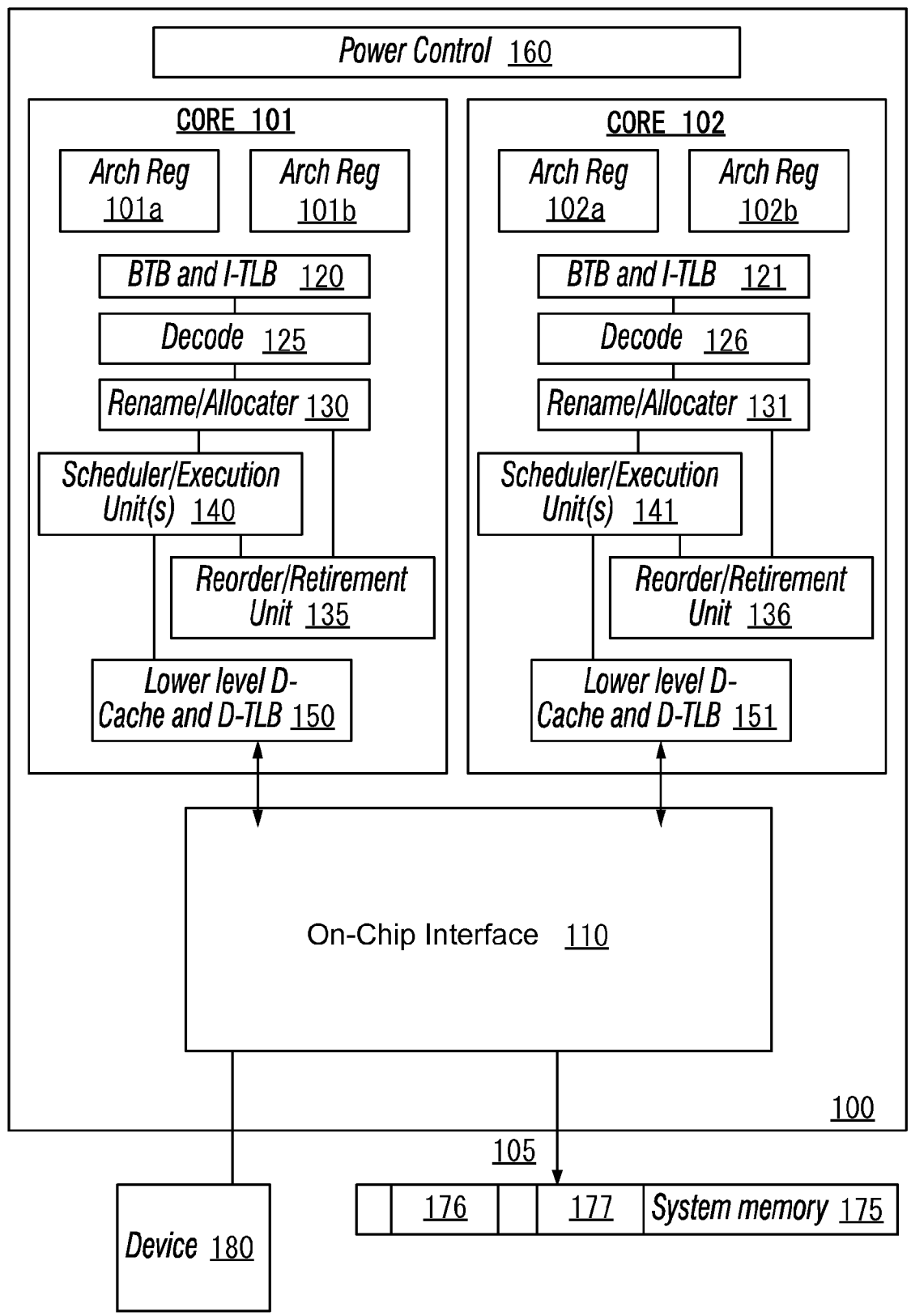
FIG. 1 is a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces.

Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

For certain applications, an accurate time synchronization technique between different components of a system may be useful. In this way, these components can share a common view of wall clock time with high (e.g., nanosecond (ns)) accuracy. Example uses include industrial control, audio-video, human interface including speech processing and haptic feedback, time of use billing, and others. Embodiments may be used to provide precise time measurement (PTM) in connection with devices that communicate via a high speed serial communication protocol such as Peripheral Component Interconnect Express (PCIe) or SuperSpeed Universal Serial Bus (USB) (USB 3.0).

To this end, embodiments may provide a mechanism to enable a physical unit (PHY) of a device to accurately report transmit and receive timings for transit of information through the PHY. More specifically, embodiments may be used to accurately determine and report latency for communication of information from input pins of a device through a PHY and thereafter to another portion of the device, e.g., a media access control (MAC) portion, and vice versa. In particular embodiments, a PIPE-compliant device includes logic to provide this precise time measurement. PIPE is an industry specification defining a MAC/PHY interface for PCIe, USB and other technologies, the current version of which is PHY Interface for the PCI Express, SATA, and USB 3.1 Architectures version 4.2 (published by Intel Corporation, 2013) (hereafter PIPE specification).

Figure 2:
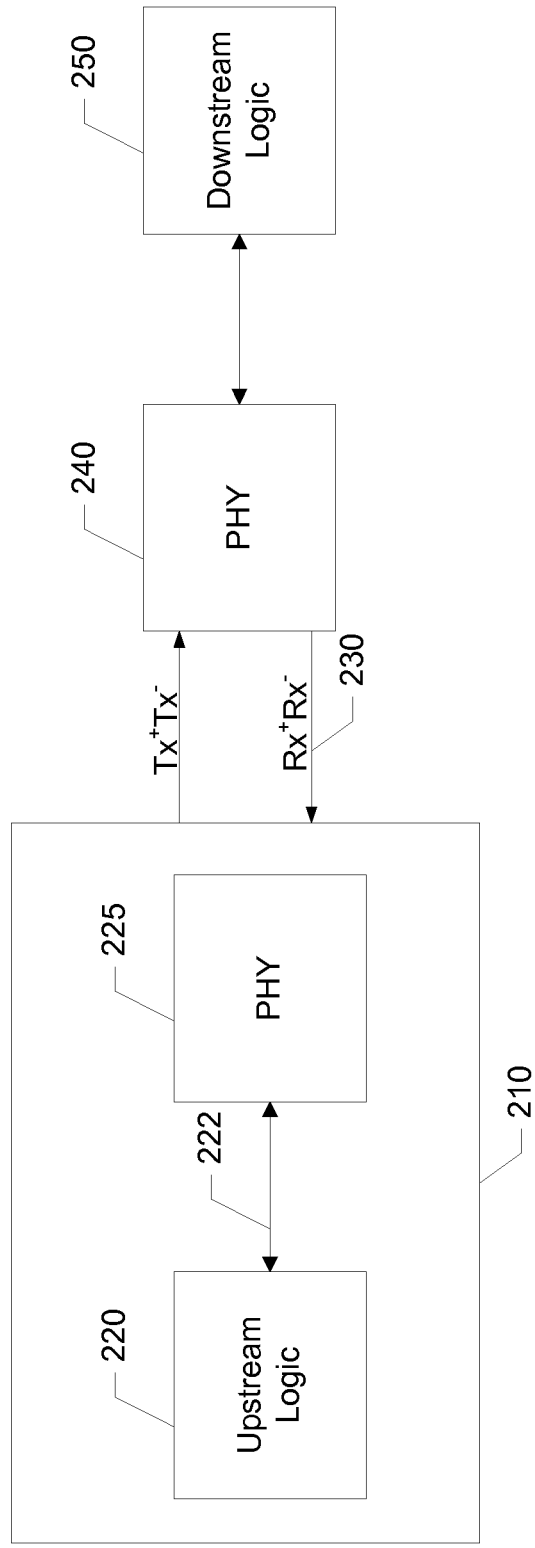
FIG. 2 is a block diagram of an example of a portion of a system on a chip and its connection to off-chip components.

Referring now to FIG. 2, shown is a block diagram of an example of a portion of a system on a chip and its connection to off-chip components. As seen in FIG. 2, a system 200 may include a SoC 210 that includes upstream logic 220, which may be any of various types of circuitry, such as processing circuitry, other functional circuitry, controller circuitry and so forth, and which may further include a link portion of a Link-PHY interface. This concept of upstream and downstream may be based on usage of those terms in the PCI Express™ Specification Base Specification version 2.0 (published Jan. 17, 2007). However, understand that embodiments are not limited to a PCIe™ implementation and upstream and downstream can simply refer to direction of communication with respect to a core element of the SoC (e.g., one or more cores of the SoC, which may be coupled upstream of upstream logic 220).

Via an on-chip interconnect 222, upstream logic 220 communicates with a PHY 225. As described above, in some embodiments this PHY may be in accordance with the PIPE specification. In general, a PHY operates to take incoming signals, which may be received in parallel at high speed and condition and transform the signals for output via a physical interconnect 230, that is, an off-chip interconnect. In the implementation shown, the off-chip interconnect may be a pair of unidirectional differential lines to transmit data to a corresponding PHY 240, which in some embodiments may be a standalone IC, and to receive an incoming differential signal pair from PHY 240. In other embodiments there may be multiple pairs of Rx/Tx signals, and the Rx and Tx need not be symmetric. Note that as shown in FIG. 2, Rx and Tx are relative to SoC 210, and they are reversed for PHY 240. In turn, PHY 240 may communicate with a downstream logic 250, which again may be a separate IC including a given type of functionality, such as a peripheral controller, e.g., a disk controller, network interface card or so forth. While shown with this particular implementation in the embodiment of FIG. 2, understand that in other implementations PHY 240 and downstream logic 250 may be configured on a single semiconductor die. Furthermore, understand that in different embodiments, much more circuitry may be present within a SoC.

In one PTM embodiment, packet transmit and receive times may be measured at the device's pins. Because latencies within the PHY are variable, the PHY may be configured to report the actual latency to the MAC so that the MAC can adjust time values accordingly. Embodiments may provide a set of additional MAC/PHY interface signals to provide this PTM information.

In an embodiment, a PIPE interface itself provides PHY transit latency, which may be provided on a per-symbol basis. In an embodiment, the interface signals include: transmit and receive latency values (TxTime and RxTime), which correspond to the PHY transit latency (and may be communicated in terms of ns or other suitable units); and latency valid signals (TxTimeValid and RxTimeValid), which provide a valid indication active for one clock cycle per corresponding transmitted/received symbol. Understand that other latency measurement signals used for purposes of PTM information may be present in other embodiments.

In an embodiment, the time values (TxTime and RxTime) are derived from a free-running counter that is driven by a PTM clock. This PTM clock is an accurate local clock. Note that this PTM clock need not support ns granularity, and in an embodiment may operate between approximately 10 megahertz (MHz) and 1 gigahertz (GHz). This free-running counter is Gray encoded so that it can be safely sampled asynchronously, in an embodiment. The PHY's receive path (Rx) latency will vary due to differences between the recovered bit clock and a local clock, referred to herein as a PCLK, at which parallel samples are output by the PHY.

In an embodiment, a PTM circuit for the Rx path of a PHY is configured to sample the free-running counter for each symbol received at each edge of the recovered symbol clock. This sample is propagated through the Rx path in a pipeline that is locked 1:1 to the corresponding symbol, including particularly through an elastic buffer, where the buffer depth will vary depending on the receive clock to PCLK rates. Note that PIPE supports various data path widths, and the sampling of the counter is maintained on a per-symbol basis any time the PHY performs a data path width conversion. At the end of the PTM circuit, this counter value is converted from Gray code to a conventional time value and subtracted (with appropriate wrap-around) from the current counter value to provide a latency value. In an alternate implementation, one could maintain a counter associated with only the variable elements, e.g., the elastic buffer, and then perform appropriate arithmetic for each symbol to determine the PHY transit time.

For cases where the transmit latency of a transmit path (Tx) of a PHY is not fixed, the Tx path includes a PTM circuit also having a free-running counter. In an embodiment, the same counter may be used by both Tx and Rx PTM circuits. In turn, this counter is sampled for each unit of data provided for transmission at each PCLK edge. Note that for another variant, the PCLK could be used as the accurate local clock. This sample is propagated through the Tx path in a pipeline that is locked 1:1 to the Tx clock rate. Note that PIPE supports various data path widths, and the sampling of the counter is maintained on a per-symbol basis any time the PHY performs a data path width conversion. At the end, this counter value is converted from Gray code to a conventional time value, and subtracted (with appropriate wrap-around) from the current counter value to provide a latency. For the case where the PHY's Tx latencies are fixed, this PTM logic need not be used, and the fixed value is simply reported. In some cases, the TxValid signal may not be present, and the Tx latency can be provided through other means, for example, via a data sheet. Note there can be an analogous case for the Rx path, e.g., by introducing a compensating latency in the PHY, to ensure that the Rx latency is consistent.

Figure 3:
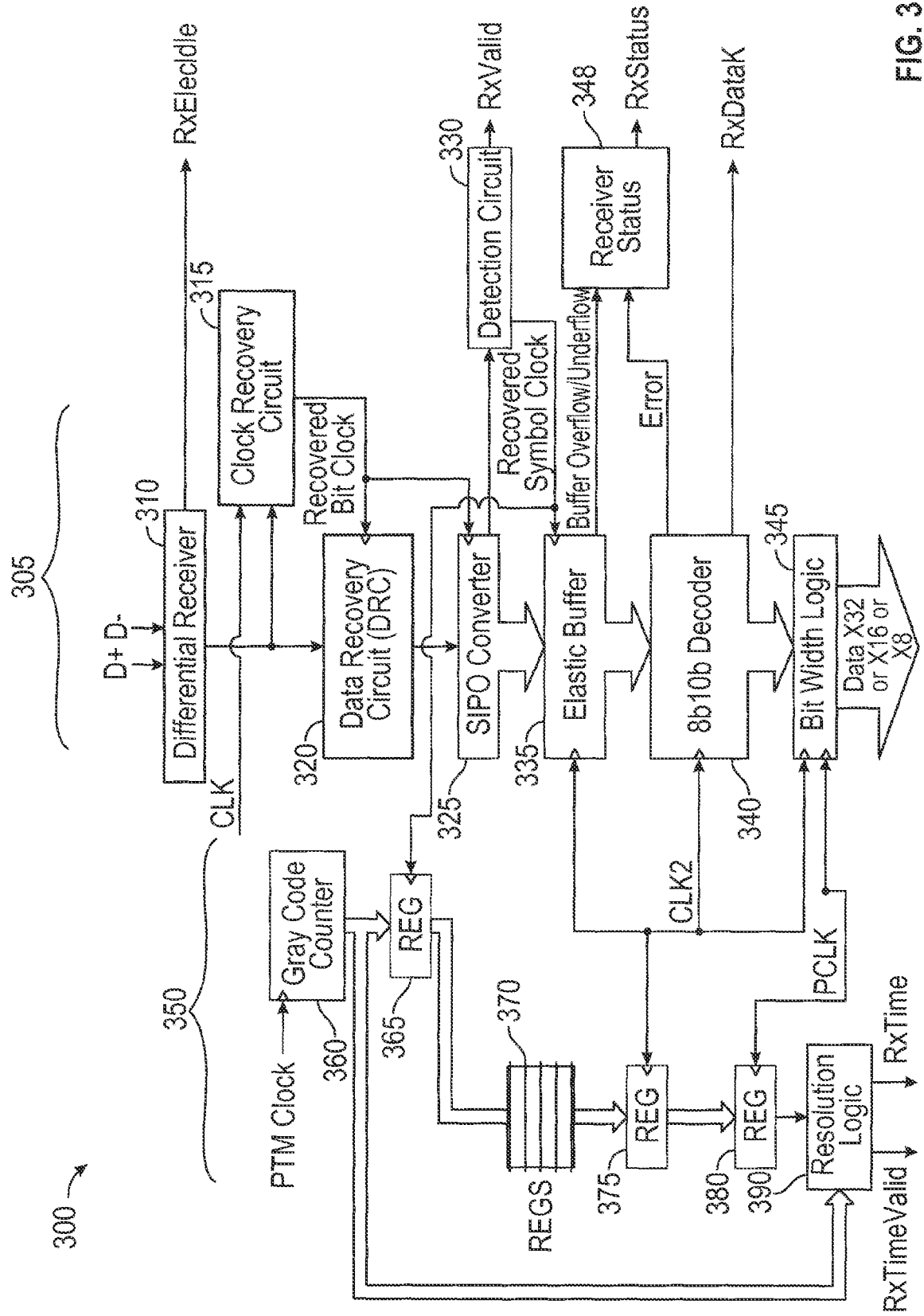
FIG. 3 is a block diagram of a portion of a receiver device in accordance with an embodiment of the present invention.

Referring now to FIG. 3, shown is a block diagram of a portion of a receiver device in accordance with an embodiment of the present invention. As shown in FIG. 3, receiver device 300 is configured to receive incoming information in the form of a differential serial signal (D+/D−) and process the incoming information into a form for provision to additional downstream logic of the receiver device. In various implementations, this processing may generally include a conversion of the incoming differential serial data to a parallel form of a desired data width, as well as performing clock recovery operations and decoding according to a given encoding scheme.

In the embodiment shown in FIG. 3, receiver 300 includes a main data processing path 305 and a separate precise time measurement path 350. Each will be discussed in turn. In general, embodiments provide PTM path 350 to enable a latency determination for traversal of data from the input of receiver device 300 (generally at pins of the device) to a communication of parallel data to other portions of the receiver device, e.g., a MAC layer to occur with high accuracy.

With reference to data signal processing path 305, the incoming information stream is provided to a differential receiver 310 that generates a serial bitstream provided to both a data recovery circuitry 320 and a clock recovery circuit 315. From the bitstream provided to clock recovery circuit 320, a recovered bit clock signal is generated and is provided to clock both data recovery circuit 320 and a serial-to-parallel converter 325. In an embodiment, converter 325 is configured as an ×10 converter such that incoming serial bits are collected until 10 bits are present, whereupon a parallel width of 10 bits is provided both to a detection circuit 330 and an elastic buffer 335. Understand that variations in the receiver path are possible. For example, in some cases the data may be placed into the elastic buffer in the serial domain, and the SIPO conversion done at the output of the elastic buffer.

Elastic buffer 335 includes a plurality of entries each to store incoming parallel data words, e.g., each a 10 bit symbol, or other possible information such as status, control, or other information. In an embodiment, buffer 335 may have between approximately 8-50 entries.

In an embodiment, detection circuit 330 is configured to detect a predetermined symbol, which in a PCIe implementation may correspond to a K28.5 control symbol. When such symbol is detected, this constitutes a beginning of a packet symbol and thus a recovered symbol clock signal is generated and is used to clock a write port of elastic buffer 335. In an embodiment, the symbol clock is locked to the bit clock based on the alignment determined by detecting the K28.5 symbol such that the symbol clock continues to trigger at the appropriate interval (e.g., every 10b). In turn, a read port of elastic buffer 335 is configured to receive a read clock signal, e.g., obtained from a local clock, which generally may operate at a different frequency, e.g., 125 or 250 MHz.

Still referring to the main signal processing path 305, when elastic buffer 335 is read according to this read clock signal, a data word (e.g., a 10 bit symbol) is output to a decoder 340, which in an embodiment is an 8b10b decoder to thus generate an 8 bit word from 10 bits of the symbol. Note it is also possible to locate the 8b/10b conversion before the elastic buffer. Next, a bit width logic 345 may optionally be present, and may be used to generate a parallel data packet of a desired width (e.g., ×8, ×16, or ×32) which is output to further circuitry of the receiver device (not shown for ease of illustration in FIG. 3). In an embodiment, this parallel data may be provided to MAC circuitry of the device for further processing. Of course understand that additional components and signals may be present in a given receiver; however they are not addressed here so as not to obscure the disclosed subject matter. There are other encoding schemes, e.g., 128b/130b (used in PCIe "Gen 3" 8GT/s mode), that can be applied in place of 8b/10b, which do not change the general aspects of PTM processing.

Still referring to FIG. 3, further illustrated is PTM path 350. In general, PTM path 350 is configured to determine, with high accuracy, a latency of data traversal within the main signal processing path 305. To this end, a counter 360 is present, which in an embodiment may be a free-running counter such as Gray code counter. In an embodiment, this counter may have a width between approximately 4 and 7 bits wide. As seen, counter 360 is clocked by a PTM clock, which in an embodiment is a clock signal generated from an accurate local clock. In one embodiment, the PTM clock may operate at a frequency of 100 MHz and may correspond to a local sub-clock. By way of this local sub-clock, high accuracy can be realized, as the clock may be configured with high accuracy (e.g., within 50 ppm), and to operate without spread spectrum clocking.

The output of counter 360 is provided to a storage device 365 which in an embodiment is implemented as a register that is sampled according to the recovered symbol clock signal. As further described below, note that the output of counter 360 is coupled to additional logic of PTM path 350.

When sampled according to the recovered symbol clock, the stored counter value is provided to a mirror elastic buffer 370 which is configured to maintain alignment with corresponding elastic buffer 335. Thus in an embodiment, the number of entries of mirror elastic buffer 370 may be the same as the number of entries present in elastic buffer 335.

In a particular implementation, rather than providing for a separate mirror elastic buffer, a wider elastic buffer 335 may be provided to present a width to accommodate both the parallel data received from converter 325 and the count values output by register 365. In such an implementation, certain design constraints may be relaxed.

In either event, output values from mirror elastic buffer 370 are provided to another storage 375, implemented as another register that in turn is sampled by a local clock (namely the same local clock that acts as the read port clock for elastic buffer 335 and the clock for decoder 340). Another storage 380 is coupled in cascade to this register 375 and may be implemented as yet another register that is the sampled according to a parallel clock (PCLK) (provided for output of parallel data of the appropriate bit width from bit width logic 345).

When sampled, the resulting count value is provided to a resolution logic 390 that further receives the current counter output directly from counter 360. In general, resolution logic 390 may determine a latency of data pipeline traversal based at least in part on these two counter values, namely the counter value provided through PTM path 350 and the current counter value directly obtained from counter 360. In the embodiment shown in FIG. 3, this latency value may be communicated as the signal RxTime along with a latency valid signal, RxTime Valid, which may be active once per symbol. Although shown at this high level in the embodiment of FIG. 3, understand the scope of the present invention is not limited in this regard.

For example, in another implementation instead of providing a full separate path for performing PTM operations, a small amount of circuitry can be added to the main data processing path to generate the PTM information described herein. In this optimization, at least portions of the PTM path may be avoided.

More specifically in another embodiment, to determine the variable latency incurred by the elastic buffer, logic associated with the elastic buffer may be provided to further write into an incoming entry additional information regarding a current depth of the elastic buffer (namely the number of pending entries in the buffer at the time a new entry is written). In an embodiment in which elastic buffer 335 is a 30 entry buffer, each entry may be extended by 5 bits to thus accommodate a count value corresponding to the current buffer depth at the time the entry is written. To this end, elastic buffer 335 may include a PTM logic internally to maintain information regarding the current depth of the buffer and to store a value corresponding to the current depth in connection with storage of an incoming entry into the elastic buffer. Then this information may travel with the entry as it traverses elastic buffer 335 and the remaining portions of the data processing path such that this information is made available to the MAC layer for further processing. In some embodiments, this depth value may be communicated as one or more sideband signals apart from the main signal processing path. Depending on how the output is expressed, in both cases, for the Rx, one might have a valid signal for the PTM output or one might combine the PTM output with the received symbol output in which case the same "valid" indication applies to both. For the Tx, if there is a dynamic PTM output, a valid indication also is produced.

Note that this PTM value provided along with data that is output from elastic buffer 335 is an accurate measure of the variable latency. However understand that a fixed latency for traversal of data through additional portions of the PHY unit still occurs. Given that this latency is fixed, the MAC layer (or a higher protocol layer) may simply add a predetermined value corresponding to the fixed latency to this PTM value to thus obtain the true PTM latency for traversal of the PHY unit, in this embodiment.

Figure 4:
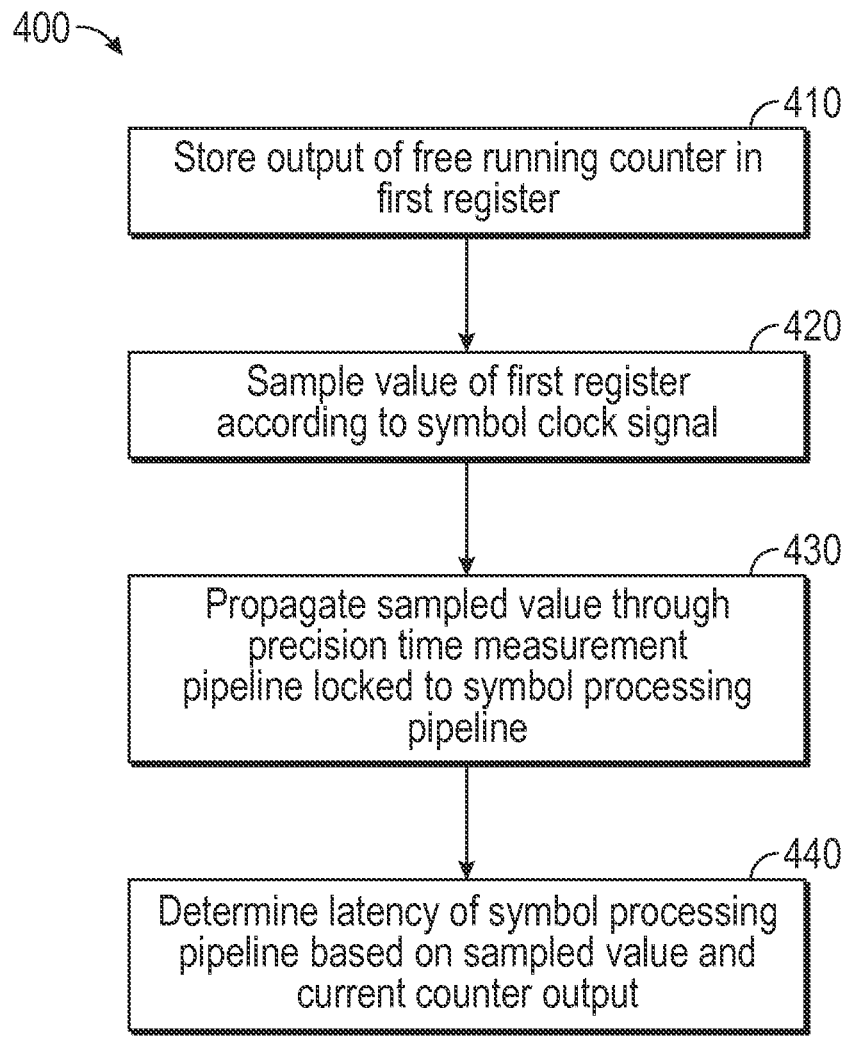
FIG. 4 is a flow diagram of a method in accordance with an embodiment of the present invention.

Referring now to FIG. 4, shown is a flow diagram of a method in accordance with an embodiment of the present invention. As shown in FIG. 4, method 400 may be used to perform a precise time measurement operation to determine with high accuracy a latency of data traversal through a data processing path, e.g., of a PHY unit. In an embodiment, control logic within the PHY itself, e.g., a separate PTM processing path, may perform the PTM determination. Thus the embodiment of FIG. 4 is for use in connection with a separate parallel path for PTM processing such as shown in FIG. 3.

As seen, method 400 begins by storing an output of a free running counter in a first register. In an embodiment, the free running counter may be a Gray code counter having 6 bits and to count between a start value and an end value. This counter may operate according to a local PTM clock and thus may output count values for storage into this first register according to the clock signal. Note however that this register is not necessarily sampled at each counter value output. That is, this first register may be sampled according to a symbol clock signal that is recovered from an incoming data stream. Thus at block 420 the current value stored in the first register may be sampled according to this symbol clock signal. Next at block 430 this sampled value may be propagated through a PTM pipeline that is locked to the symbol processing pipeline. In an embodiment, this PTM pipeline may include a mirror elastic buffer having the same number of entries as an elastic buffer of the main signal processing path. Additional storage elements or registers may be provided to account for latencies of additional processing components of the main signal processing path.

Finally, at block 440 a latency of the symbol processing pipeline may be determined. More specifically, this latency may be based on the sampled value, as propagated through the PTM pipeline and a current counter output value, which may be provided directly from the free running counter. Of course additional considerations may be taken into account in determining latency. For example, not all components of the signal processing path may be accounted for by the PTM pipeline. As such, one or more predetermined values may further be included in the latency determination to account for additional processing components within the main data processing path. One example of an actual calculation is as follows:

```
RxTimeValid :=
  (modulo-counter-width(CurrentPTMCount − SampledPTMCount) +
  ConstantPartofDelayThroughRx
```

The determined latency may be provided as a time value to further portions of the receiver device, e.g., MAC circuitry, which may further process the information optionally provided to higher layers such as link and transaction layers for or which may be still further processing. In addition to providing this latency information, a valid signal may also be generated to indicate the active and valid transit latency value for one PCLK of the corresponding symbol. Understand that while method 400 is assumed to be for purposes of a receiver pipeline, similar operations can be performed for a transmit pipeline to determine a latency time for that transmit circuitry.

Figure 5:
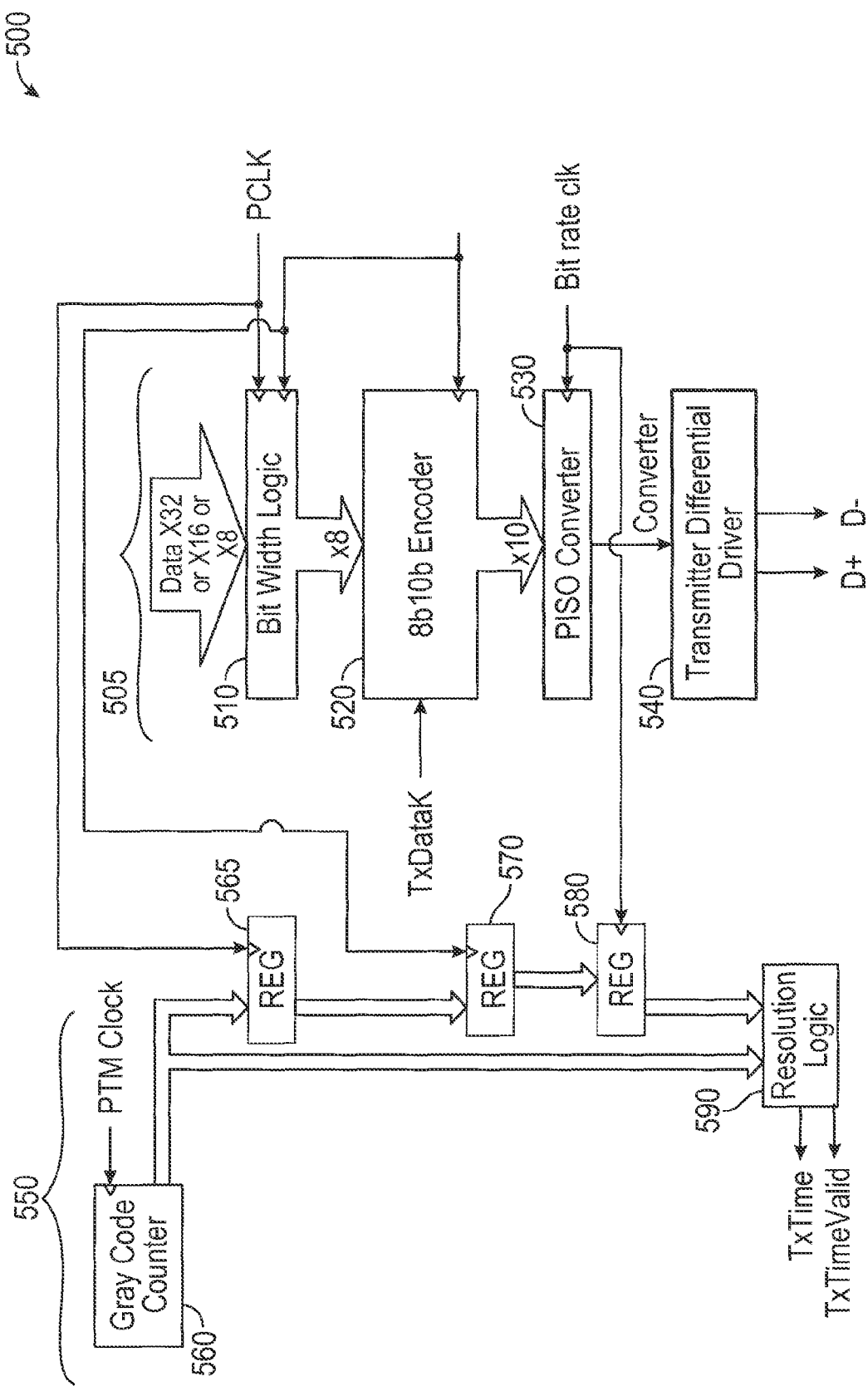
FIG. 5 is a block diagram of a portion of a transmitter device in accordance with an embodiment of the present invention.

Referring now to FIG. 5, shown is a block diagram of a portion of a transmitter device in accordance with an embodiment of the present invention. As shown in FIG. 5, transmitter device 500 is configured to receive incoming parallel information, e.g., from a MAC unit of a device and process the incoming information into a form for communication to another device coupled to the transmitter device via an interconnect. In various implementations, this processing may generally include a conversion of the incoming parallel data of a given width to differential serial data, as well as performing encoding according to a given encoding scheme.

In the embodiment shown in FIG. 5, transmitter 500 (which may be a transmit portion of a device further including a receiver portion such as receiver 300 of FIG. 3) includes a main data processing path 505 and a separate precise time measurement path 550. In general, embodiments provide PTM path 550 to enable a latency determination to occur so that it can be determined with high accuracy the latency for traversal of data from the input to transmitter device 500 (e.g., via a MAC/PHY interface) to a communication of differential serial data via pins of the device.

With reference to data signal processing path 505, the incoming parallel data is provided an optional bit width logic 510 to convert incoming parallel data to an appropriate bit width (e.g., 8 bit words) (e.g., from an ×16 or ×32 width) that in turn is provided to an encoder 520. In an embodiment encoder 520 is an 8b10b decoder to generate a 10 bit symbol from the 8 bits. Of course, other encoding schemes, e.g., 128b/130b can be applied in place of 8b/10b, which do not change the general aspects of PTM processing. Next, a parallel-to-serial converter 530, which in an embodiment is configured to convert the parallel data into a serial format for passing to a differential driver 540 that generates a differential serial bitstream for output via pins of the device. Of course understand that additional components and signals may be present in a given receiver; however they are not addressed here so as not to obscure the disclosed subject matter.

Still referring to FIG. 5, further illustrated is PTM path 550. In general, PTM path 550 is configured to determine, with high accuracy, a latency of data traversal within the main signal processing path 505. To this end, a counter 560 is present, which in an embodiment may be a free-running counter such as Gray code counter. In some embodiments, this counter may be shared with a PTM logic of a receive path. As seen, counter 560 is clocked by a PTM clock.

The output of counter 560 is provided to a storage device 565 which in an embodiment is implemented as a register that is sampled according to the PCLK. As further described below, note that the output of counter 560 is coupled to additional logic of PTM path 550.

When sampled according to this clock signal, the stored counter value is provided to another storage 570, e.g., another register that in turn is sampled based on a bit rate clock (e.g., 10% of this clock rate). From here, the sampled value is provided to yet another storage 480, which in the embodiment shown is another register that in turn is clocked by the bit rate clock itself. Note that storages 565, 570, and 580 may all be of multiple stages of back-to-back registers, e.g., so a 3 clock delay on element 570 maintains alignment with a 3 clock pipeline through the encoder.

When this storage is sampled, the resulting count value is provided to a resolution logic 590 that further receives the current counter output directly from counter 560. In general, resolution logic 590 may determine a latency of data pipeline traversal based at least in part on these two counter values, namely the counter value provided through PTM path 550 and the current counter value directly obtained from counter 560. In the embodiment shown in FIG. 5, this latency value may be communicated, e.g., back to the MAC unit, as the signal TxTime along with a latency valid signal, TxTime Valid, which may be active once per symbol. Although shown at this high level in the embodiment of FIG. 5, understand the scope of the present invention is not limited in this regard. For example, instead of providing a separate PTM path for determining the latency, particularly in the transmit direction, a predetermined latency value may be available and avoid the need for this separate path. In such an embodiment, this predetermined value may be communicated to a receiver such that receiver may perform any appropriate calculations to leverage this transit latency information. Also it is possible to provide a similar reduced time measurement path such as described above with regard to receiver 300.

Figure 6:
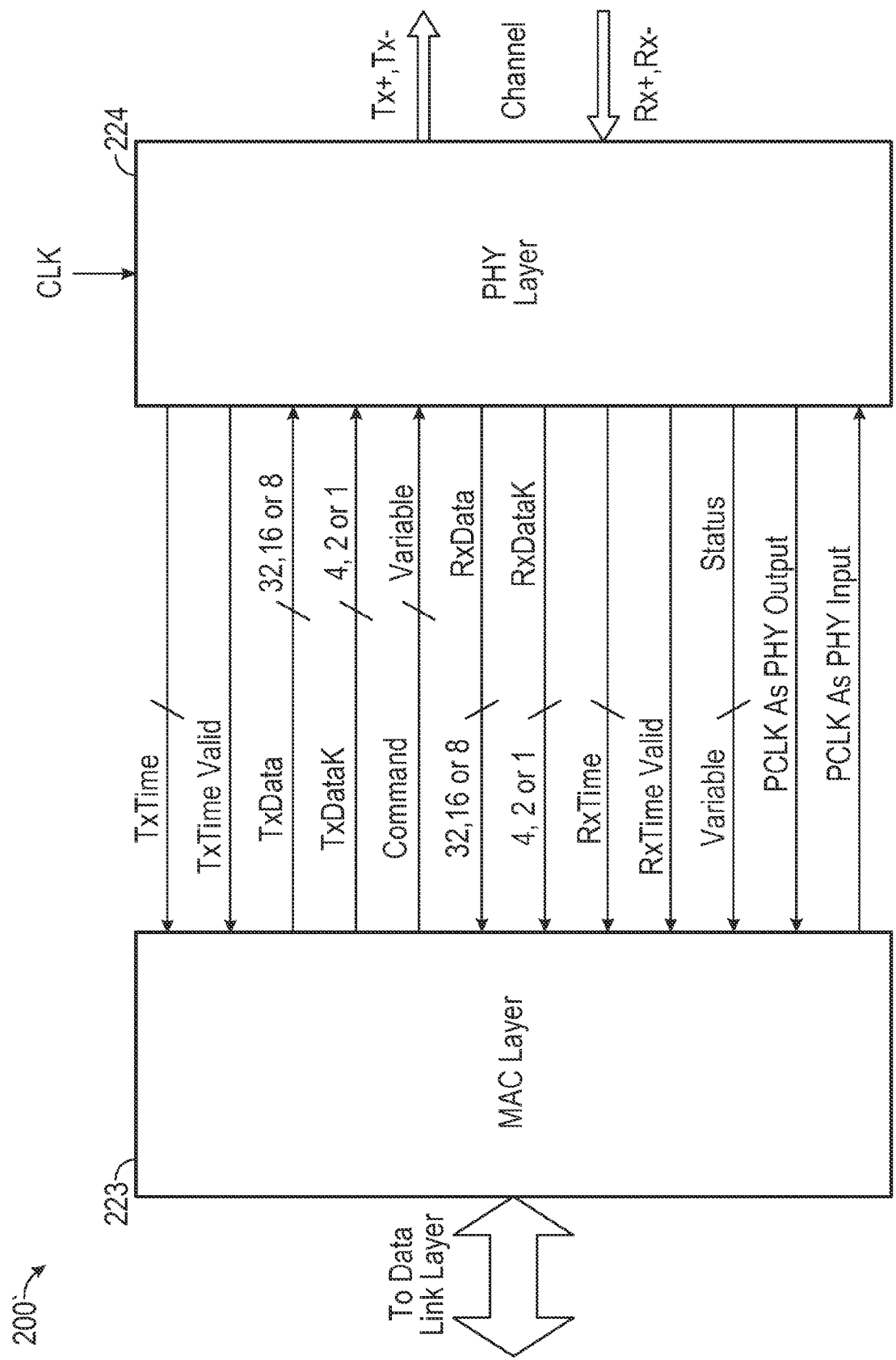
FIG. 6 is a block diagram of a PHY/MAC interface of a device in accordance with an embodiment of the present invention.

Referring now to FIG. 6, shown is a block diagram of a PHY/MAC interface of a device in accordance with an embodiment of the present invention. As shown in FIG. 6, device 200', which may be a single IC, such as SoC 200 of FIG. 2, includes an interface between a MAC layer 223 and a PHY layer 224. As seen, MAC layer 223 couples to higher layers including a link layer, while in turn PHY layer 224 may be coupled to a physical interconnect, e.g., by differential signal pairs in the transmit and receive directions.

Various signaling occurs between MAC layer 223 and PHY layer 224. In general, data (TxData) and data/control signals (TxDataK) to be transmitted from device 200 is sent from MAC layer 223 to PHY layer 224 along with a variable amount of command signals. In addition, for each symbol communicated by PHY 224, a latency time value (TxTime) and a latency time valid signal (TxTime Valid) may be sent back to MAC layer 223 to reflect the transit time expected for the TxData/etc. to be presented for transmission. Also a PCLK may be communicated in this direction.

In turn, for incoming data received within device 200', PHY layer 224 communicates parallel data as RX data (Rx-Data) with corresponding data/control information (Rx-DataK). In addition, status information of a variable length may be communicated along with a corresponding PCLK. Also for each symbol communicated, a latency time value (RxTime) and a latency time valid signal (RxTime Valid) also may be sent. Although shown at this high level in the embodiment of FIG. 6, understand the scope of the present invention is not limited in this regard.

For example, embodiments may be used in situations where there are is a multi-lane PIPE implementation. In these cases, a MAC layer may provide per lane communications with multiple PHYs of a physical layer. To communicate information between these components, multiple per lane signals in transmit and receive directions may be provided. In addition, one or more of the lanes may provide for communication of precise time measurement signals. In one particular implementation, only a single lane, e.g., a lane zero, may provide for communication of transmit and receive latency values and corresponding valid signals. As the latency is roughly the same across multiple lanes, such an optimization may reduce real estate costs while still providing accurate latency information. Of course understand that in other embodiments, each lane may provide for communication of transmit and receive latency information.

PTM may be used for a variety of applications ranging from audiovisual to industrial control. By providing a PTM mechanism for devices according to a PIPE specification or other MAC/PHY implementations, network interface controllers (NICs) or other networking devices can synchronize their time values with such devices. And, using an embodiment of the present invention, PTM can provide a PTM target accuracy of single digit ns (as good as 1 ns in an embodiment). Embodiments may be used for purposes of a PIPE interface that can be used for both PCIe and USB devices. However understand the scope of the present invention is not limited to such implementations, and the PTM mechanisms described herein may be used across a broad range of implementations, both internal to a semiconductor device and within a device ecosystem.

One interconnect fabric architecture includes the PCIe architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 7:
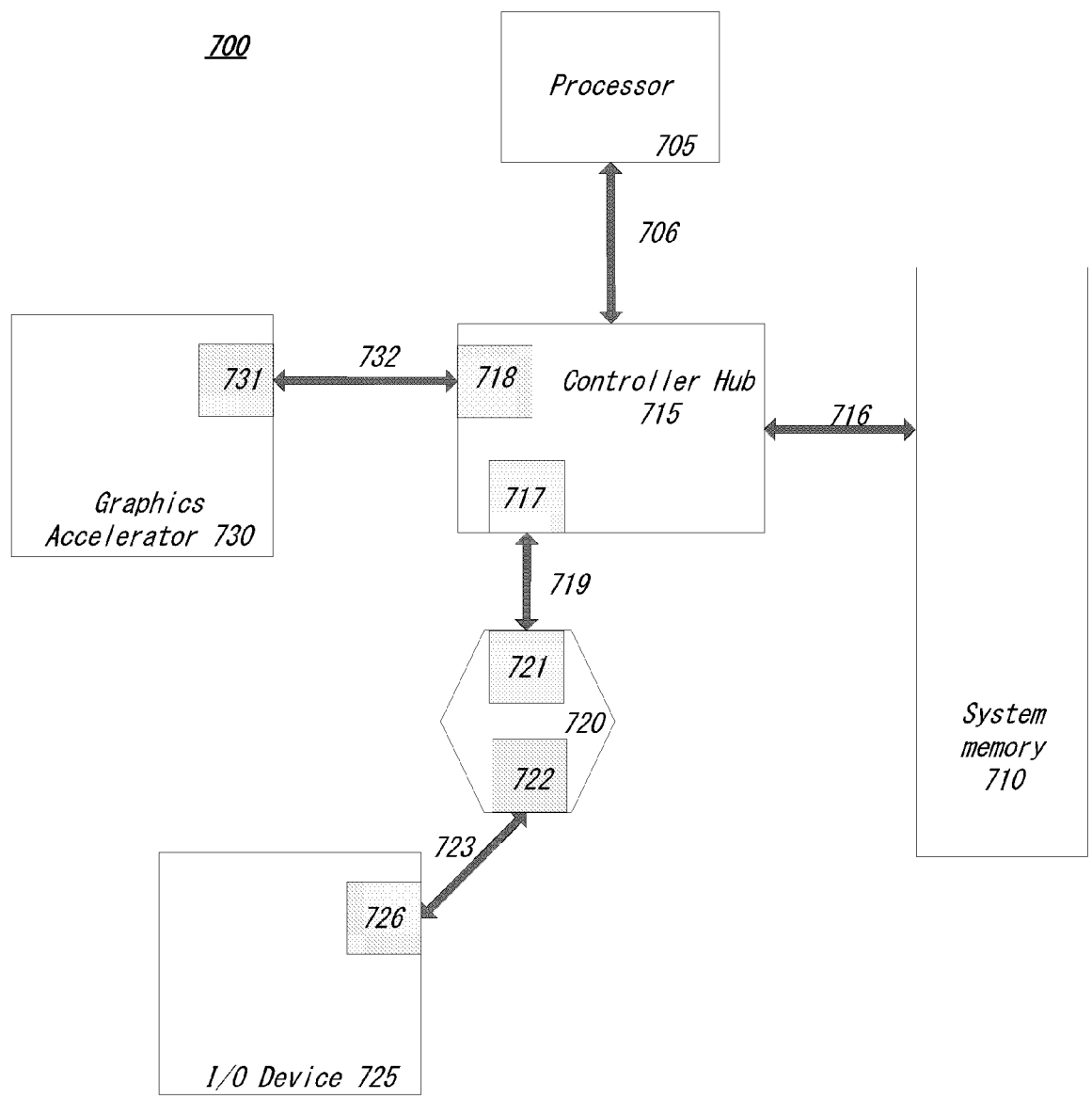
FIG. 7 is a block diagram of a fabric interconnection in accordance with an embodiment.

Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
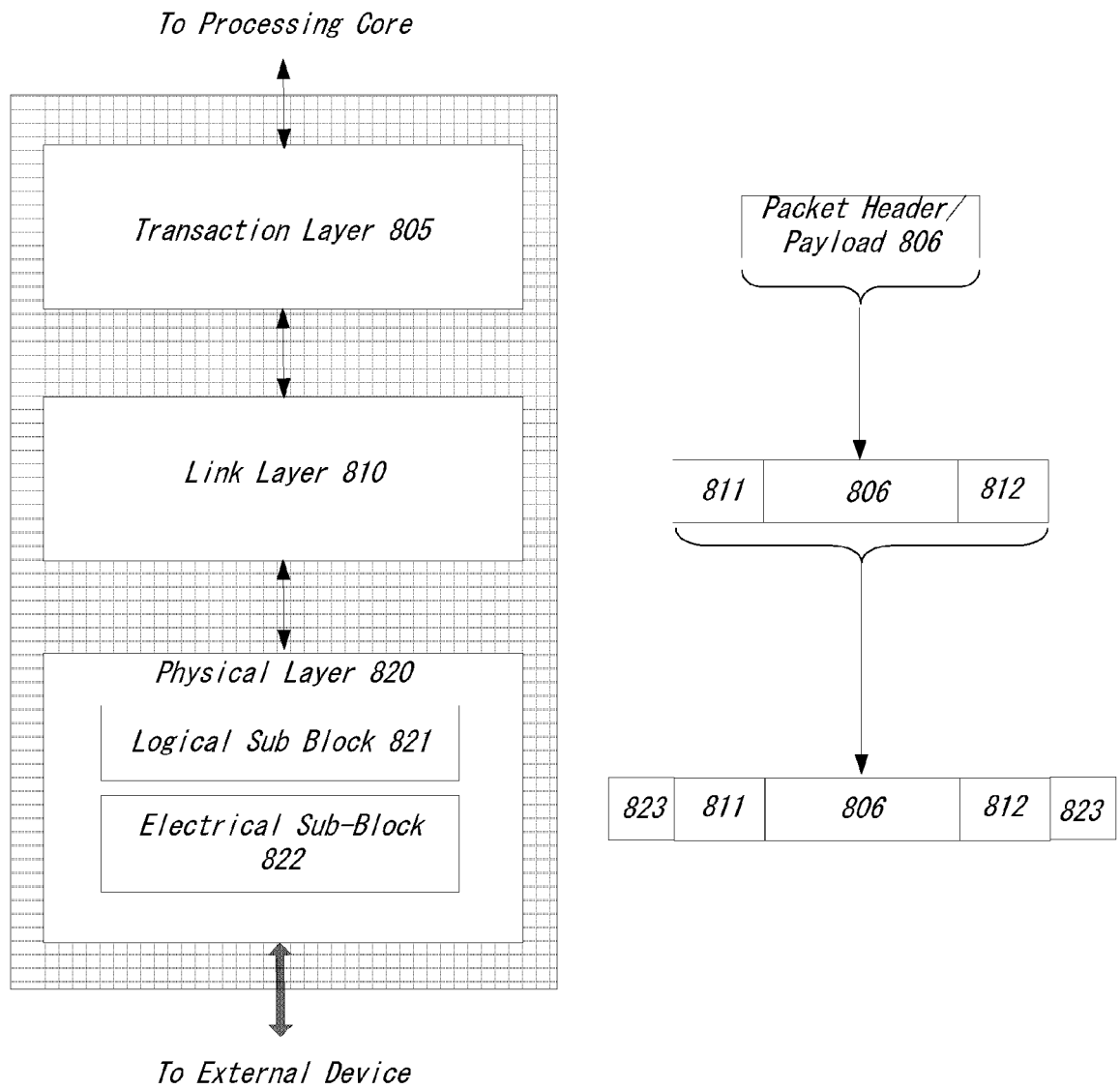
FIG. 8 is a block diagram of a layered protocol stack in accordance with an embodiment.
Figure 9:
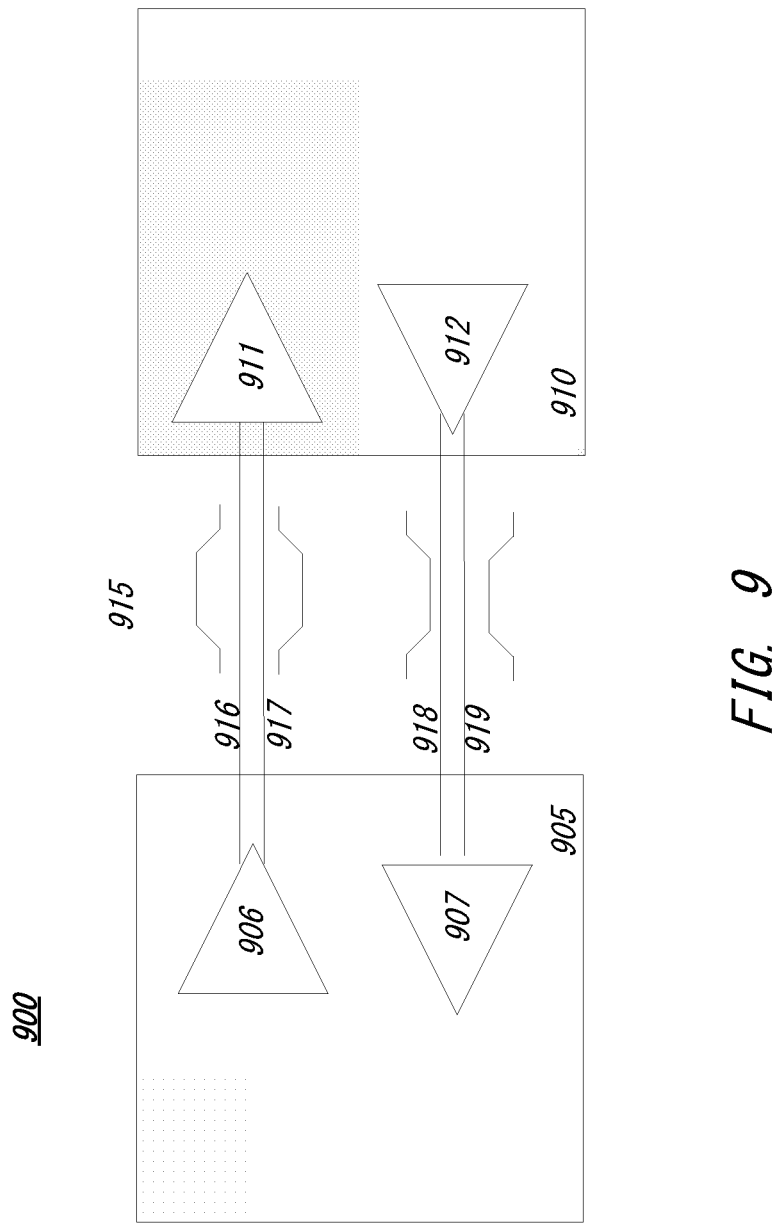
FIG. 9 is a block diagram of a point-to-point interconnection in accordance with an embodiment.

Turning to FIG. 8 an embodiment of a layered protocol stack is illustrated. Layered protocol stack 800 includes any form of a layered communication stack, such as a Quick Path Interconnect (QPI) stack, a PCie stack, a next generation high performance computing interconnect stack, or other layered stack. Although the discussion immediately below in reference to FIGS. 7-9 are in relation to a PCIe stack, the same concepts may be applied to other interconnect stacks. In one embodiment, protocol stack 800 is a PCIe protocol stack including transaction layer 805, link layer 810, and physical layer 820. An interface may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 805 of the receiving device.

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 805. An external device at the opposite end of the link, such as controller hub, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e. an identification number or packet number, calculates and applies an error detection code, i.e. CRC 812, and submits the modified TLPs to the Physical Layer 820 for transmission across a physical to an external device.

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8b/10b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a QPI layered protocol is utilized.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 415. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e., a rising edge, line 917 drives from a high logic level to a low logic level, i.e. a falling edge. Differential signals potentially demonstrate better electrical characteristics, such as better signal integrity, i.e., cross-coupling, voltage overshoot/undershoot, ringing, etc. This allows for better timing window, which enables faster transmission frequencies.

Figure 10:
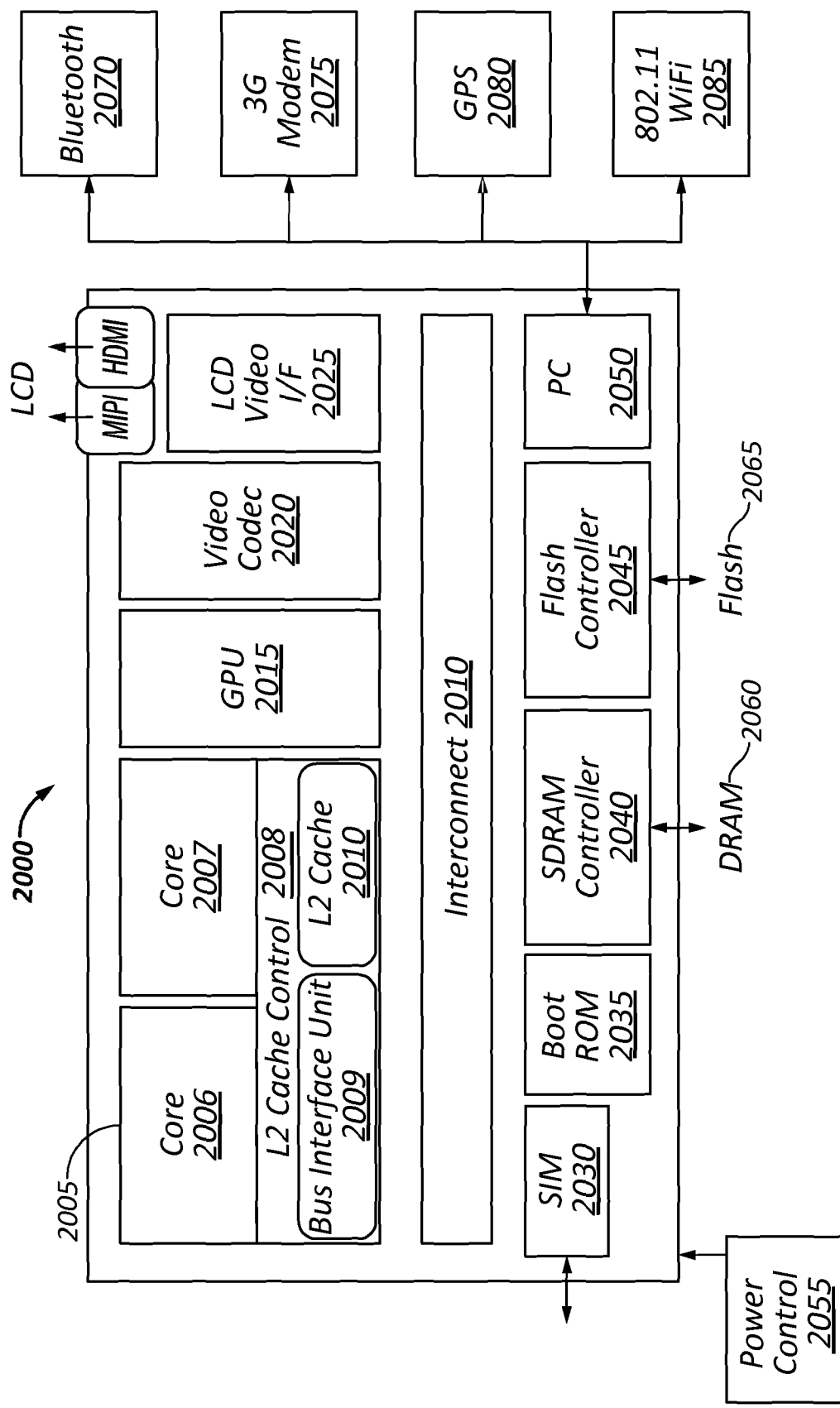
FIG. 10 is a block diagram of a system on a chip in accordance with an embodiment.

Turning next to FIG. 10, an embodiment of a SoC design in accordance with an embodiment is depicted. As a specific illustrative example, SoC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2010 includes an on-chip interconnect, such as an IOSF, AMBA, or other interconnect discussed above, which potentially implements one or more aspects of the described herein.

Interconnect 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects described herein.

In addition, the system illustrates peripherals for communication, such as a Bluetooth module 2070, 3G modem 2075, GPS 2080, and WiFi 2085. Also included in the system is a power controller 2055. Note as stated above, a UE includes a radio for communication. As a result, these peripheral communication modules are not all required. However, in a UE some form a radio for external communication is to be included.

The following examples pertain for further embodiments.

In one example, an apparatus comprises: timing logic to associate a first value with a unit of data upon entry into a path of a physical layer coupled to a serial interconnect; and latency logic to associate a second value upon an exit from the path of the physical layer and to determine a latency associated with the path of the physical layer based on the first and second values.

In an example, the apparatus further includes: a counter to count between a start value and an end value according to a local clock signal, the timing logic comprising the counter; a first register to store an output of the counter, where the first register is to be sampled according to a recovered clock signal; a mirror elastic buffer to store samples of the counter output received from the first register, where the mirror elastic buffer is to mirror an elastic buffer of the physical layer; and a resolution logic to receive a counter output sample from the mirror elastic buffer and a current counter value output from the counter, and to determine the latency for the data unit to traverse the physical layer based at least in part on the counter output sample and the current counter value, the latency logic comprising the resolution logic.

In an example, the resolution logic is to output, to a MAC unit, a time value corresponding to the latency and a valid signal to indicate that the time value is valid. The apparatus may comprise a precise time measurement circuit, and a latency of the precise time measurement circuit is locked to a latency of traversal of a symbol from an interconnect interface of the physical layer to a MAC interface.

In an example, the counter comprises a Gray code counter and where the resolution logic is to convert a difference between the current counter value and the counter output sample from a Gray code to a binary value. The physical layer may obtain the recovered clock signal responsive to detection of a first symbol in a detector of the physical layer. The mirror elastic buffer may comprise a portion of the elastic buffer, the portion comprising a plurality of entries each being a predetermined number of bits of a corresponding entry of the elastic buffer.

In another example, an apparatus comprises: a PHY to be coupled to a serial link, where the PHY comprises: a receiver path to process data that is to be received via the serial link, the receiver path to include at least one fixed latency stage that is to be associated with a fixed latency and at least one variable latency stage; and variable latency logic to determine a metric that is to be associated with the at least one variable latency stage; and PHY latency logic to determine a PHY latency for the receiver path based on the fixed latency and the metric.

In an example, the PHY includes a recovery circuitry to recover a bitstream and a first clock signal from the data, a converter to convert the bitstream into parallel data, an elastic buffer having a plurality of entries to be written according to a first clock signal and to be read according to a second clock signal, the elastic buffer corresponding to at least a portion of the variable latency stage, and the variable latency logic coupled to the elastic buffer to determine a depth of the elastic buffer when the parallel data is written into an entry of the elastic buffer and to associate a value of the depth with the corresponding entry, to enable a determination of the metric.

In an example, the variable latency logic is to store the value with the corresponding entry in the elastic buffer. The variable latency logic may include a counter having n bits, where the plurality of entries of the elastic buffer is no greater than $2^n$. The PHY may further include a decoder to decode the parallel data into a decoded symbol, the decoder coupled to an output of the elastic buffer. The PHY may communicate the value with the decoded symbol. A MAC unit may be coupled to the PHY to receive decoded symbols and corresponding values and to determine a transit latency for the PHY. The MAC unit may further include a controller to determine the transit latency based on the metric and the fixed latency.

In an example, the apparatus may be a processor that can be implemented using various means. In an example, the processor comprises a SoC incorporated in a user equipment touch-enabled device. In another example, a system comprises a display and a memory, and includes the processor of one or more of the above examples.

In another example, a method comprises: storing an output of a first counter in a first storage; sampling a value of the first storage according to a symbol clock signal; propagating the sampled value through a parallel pipeline locked to a symbol processing pipeline, the symbol processing pipeline to receive serial data and convert the serial data to parallel data and to output the parallel data to a MAC circuit; and determining, in a logic of the parallel pipeline, a latency of the symbol processing pipeline based on the sampled value and a current output of the first counter.

The method may further include, in an example, clocking the first counter with an independent clock signal. The method may further include, in an example, storing the sampled value from the first storage in a mirror buffer, the mirror buffer including a quantity of entries equal to a number of entries of an elastic buffer of the symbol processing pipeline. The method may further include, in an example, outputting the sampled value from the mirror buffer and storing the sampled value in a second storage coupled to the mirror buffer.

In an example, the method may further include providing the sampled value from the second storage to a resolution logic, the resolution logic further receiving the current output of the first counter. The method may further include, in an example, determining, in the resolution logic, the latency using the current output, the sampled value, and a predetermined value, the predetermined value corresponding to at least a portion of a fixed latency of the symbol processing pipeline.

In an example, the method may further include communicating a latency value and a latency valid signal to the MAC circuit via a sideband channel, the latency value associated with a decoded symbol communicated to the MAC circuit from the symbol processing pipeline via a primary channel.

The method may further include, in an example, communicating serial data from a PHY to a device coupled to the PHY via an interconnect, and determining a latency value corresponding to a transit latency of a transmit portion of the PHY for the communicated serial data, wherein the latency value is valid for one clock cycle per symbol and is communicated to the MAC circuit.

In another example, a computer readable medium including instructions is to perform the method of any of the above examples.

In another example, an apparatus comprises means for performing the method of any one of the above examples.

In another example, a system comprises: a receiver to receive serial data via an interconnect, where the receiver includes: a PHY to receive the serial data and convert the serial data into parallel data and to provide the parallel data to a MAC unit of the receiver, where the PHY has a variable latency between receipt of the serial data in the PHY and transmission of the parallel data to the MAC unit, the PHY further including a logic to determine a value of the variable latency and to communicate the value to the MAC unit with the parallel data; and the MAC unit to receive and process the parallel data, the MAC unit further to receive the value; and a transmitter coupled to the receiver via the interconnect to generate and communicate the serial data to the receiver.

In an example, the PHY includes a receive path and a transmit path, the transmit path to receive parallel information from the MAC unit and to convert the parallel information into a serial bitstream for communication to the transmitter via the interconnect.

In an example, the transmit path includes a second logic to communicate a second value to the MAC unit, the second value corresponding to a latency between receipt of the parallel information in the PHY and the communication of the serial bitstream to the transmitter.

In an example, the PHY includes an elastic buffer to store entries of the parallel data, the elastic buffer having a variable depth, and where the logic is to store the value with a corresponding entry in the elastic buffer. The logic may include a counter having n bits, where the plurality of entries of the elastic buffer is no greater than $2^n$. The PHY may include a symbol processing path including the elastic buffer and a time measurement path including the counter, the logic and a mirror elastic buffer to maintain a depth equal to a depth of the elastic buffer. The MAC unit may include a controller to determine a transit latency for the PHY based on the value and a predetermined fixed latency value.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a physical layer unit (PHY) to be coupled to a serial link, the PHY comprising:
        a receiver path to process data that is to be received via the serial link, wherein the receiver path is to include at least one fixed latency stage that is to be associated with a fixed latency and at least one variable latency stage;
        variable latency logic to determine a metric that is to be associated with the at least one variable latency stage; and
        PHY latency logic to determine a PHY latency for the receiver path based on the fixed latency and the metric.

2. The apparatus of claim 1, wherein the PHY further includes:
    a recovery circuitry to recover a bitstream and a first clock signal from the data;
    a converter to convert the bitstream into parallel data;
    an elastic buffer having a plurality of entries to be written according to a first clock signal and to be read according to a second clock signal, the elastic buffer corresponding to at least a portion of the variable latency stage; and
    the variable latency logic coupled to the elastic buffer to determine a depth of the elastic buffer when the parallel data is written into an entry of the elastic buffer and to associate a value of the depth 10 with the corresponding entry, to enable a determination of the metric.

3. The apparatus of claim 2, wherein the variable latency logic is to store the value with the corresponding entry in the elastic buffer.

4. The apparatus of claim 2, wherein the variable latency logic includes a counter having n bits, wherein the plurality of entries of the elastic buffer is no greater than $2^n$.

5. The apparatus of claim 4, further comprising:
    the counter to count between a start value and an end value according to a local clock signal;
    a first register to store an output of the counter, wherein the first register is to be sampled according to a recovered clock signal;
    a mirror elastic buffer to store samples of the counter output received from the first register, wherein the mirror elastic buffer is to mirror the elastic buffer; and
    a resolution logic to receive a counter output sample from the mirror elastic buffer and a current counter value output from the counter, and to determine the latency based at least in part on the counter output sample and the current counter value.

6. The apparatus of claim 5, wherein the PHY is to obtain the recovered clock signal responsive to detection of a first symbol in a detector of the PHY.

7. The apparatus of claim 5, wherein the mirror elastic buffer comprises a portion of the elastic buffer, the portion comprising a plurality of entries each being predetermined number of bits of a corresponding entry of the elastic buffer.

8. The apparatus of claim 2, wherein the PHY further includes a decoder to decode the parallel data into a decoded symbol, the decoder coupled to an output of the elastic buffer.

9. The apparatus of claim 8, wherein the PHY is to communicate the value with the decoded symbol.

10. The apparatus of claim 9, further comprising a media access control (MAC) unit coupled to the PHY to receive decoded symbols and corresponding values and to determine a transit latency for the PHY.

11. The apparatus of claim 10, wherein the MAC unit further includes a controller to determine the transit latency based on the metric and the fixed latency.

12. A system comprising:
    a receiver to receive serial data via an interconnect, the receiver including:
        a physical layer unit (PHY) to be coupled to a serial link, the PHY comprising:
            a receiver path to process data that is to be received via the serial link, wherein the receiver path is to include at least one fixed latency stage that is to be associated with a fixed latency and at least one variable latency stage;
            variable latency logic to determine a metric that is to be associated with the at least one variable latency stage; and
            PHY latency logic to determine a PHY latency for the receiver path based on the fixed latency and the metric;
        a media access control (MAC) unit to receive and process the data, the MAC unit further to receive the PHY latency; and
    a transmitter coupled to the receiver via the interconnect to generate and communicate the data to the receiver.

13. The system of claim 12, wherein the PHY further includes a transmit path, the transmit path to receive parallel information from the MAC unit and to convert the parallel information into a serial bitstream for communication to the transmitter via the interconnect.

14. The system of claim 12, wherein the PHY includes an elastic buffer to store entries of the data, the elastic buffer having a variable depth, and wherein the variable latency logic is to store the metric with a corresponding entry in the elastic buffer.

15. The system of claim 14, wherein the variable latency logic includes a counter having n bits, wherein the plurality of entries of the elastic buffer is no greater than $2^n$.

16. The system of claim 15, wherein the PHY includes a symbol processing path including the elastic buffer and a time measurement path including the counter, the variable latency logic and a mirror elastic buffer to maintain a depth equal to a depth of the elastic buffer.

* * * * *